US007127409B2

(12) United States Patent
Denning et al.

(10) Patent No.: US 7,127,409 B2
(45) Date of Patent: Oct. 24, 2006

(54) METHODS AND SYSTEMS FOR AVIATION NONCONFORMANCE COMPONENT MANAGEMENT

(75) Inventors: Paul Dean Denning, Greenhills, OH (US); John Raymond Barrett, Andover, MA (US)

(73) Assignee: General Electric Company

( * ) Notice: Subject to any disclaimer, the term of this patent is extended or adjusted under 35 U.S.C. 154(b) by 951 days.

(21) Appl. No.: 09/797,226

(22) Filed: Mar. 1, 2001

(65) Prior Publication Data

US 2002/0123915 A1 Sep. 5, 2002

(51) Int. Cl.
*G06Q 10/00* (2006.01)
(52) U.S. Cl. .............................. 705/7; 702/81
(58) Field of Classification Search ................ 702/81; 705/7
See application file for complete search history.

(56) References Cited

U.S. PATENT DOCUMENTS

| | | | |
|---|---|---|---|
| 5,086,397 A | 2/1992 | Schuster et al. | |
| 5,311,438 A | 5/1994 | Sellers et al. | |
| 5,568,408 A | 10/1996 | Maeda | |
| 5,737,581 A | 4/1998 | Keane | |
| 5,844,803 A | 12/1998 | Beffa | |
| 5,848,115 A * | 12/1998 | Little et al. | 378/4 |
| 5,864,483 A | 1/1999 | Brichta | |
| 5,923,553 A | 7/1999 | Yi | |
| 5,956,251 A | 9/1999 | Atkinson et al. | |
| 5,974,395 A | 10/1999 | Bellini et al. | |
| 6,035,243 A | 3/2000 | Galuga et al. | |
| 6,081,789 A | 6/2000 | Purcell | |
| 6,151,582 A | 11/2000 | Huang et al. | |
| 6,157,915 A | 12/2000 | Bhaskaran et al. | |
| 6,163,732 A | 12/2000 | Petke et al. | |
| 6,167,380 A | 12/2000 | Kennedy et al. | |
| 6,192,286 B1 | 2/2001 | Oku | |
| 6,202,037 B1 | 3/2001 | Hattori et al. | |
| 6,240,329 B1 | 5/2001 | Sun | |
| 6,249,774 B1 | 6/2001 | Roden et al. | |
| 6,259,960 B1 | 7/2001 | Inokuchi | |
| 6,260,024 B1 | 7/2001 | Shkedy | |
| 6,269,279 B1 | 7/2001 | Todate et al. | |
| 6,336,078 B1 * | 1/2002 | Sakayori et al. | 702/81 |
| 6,505,145 B1 * | 1/2003 | Bjornson | 702/185 |

OTHER PUBLICATIONS

Web.archive.org webpage of Nov. 11, 1999, "Database for Quality Highlights", pp. 1-2.*
Web.archive.org webpage of Mar. 7, 2000, "Database for Quality", pp. 1-2.*
Web.archive.org webpage of Nov. 10, 1999, "Overview of DBQ", pp. 1-2.*

(Continued)

*Primary Examiner*—Tariq Hafiz
*Assistant Examiner*—Jonathan G Sterrett
(74) *Attorney, Agent, or Firm*—William Scott Andes; Robert B. Reeser (57) ABSTRACT

A computerized business process that captures component nonconformance data elements at an inspection process level is described. The nonconformance data is gathered via network-based data capture screens and image capture workstations. The data elements include information regarding the aircraft component nonconformance, component disposition, and if necessary, the repair or non-repairable status, type of repair to be conducted, primary non-repairable defect, and digital images of the nonconforming component feature. The information is uploaded to a database integrated with a nonconformance management system. The data is available for users, suppliers, and customers to view through a secure connection to a business entity's server system. The customer logs onto the system and accesses captured data elements and images.

15 Claims, 11 Drawing Sheets

OTHER PUBLICATIONS

Web.archive.org webpage of Oct. 9, 1999, "Entering Data", pp. 1-2.*
Web.archive.org webpage of Oct. 9, 1999, "Specifications", pp. 1-2.*
Web.archive.org webpage of Oct. 9, 1999, "Reporting", pp. 1-2.*
Web.archive.org webpage of Oct. 9, 1999, "Certificates of Analysis", p. 1.*
Web.archive.org webpage of Oct. 9, 1999, "User Menus", p. 1.*
Web.archive.org webpage of Oct. 9, 1999, "Notes and Attachments", pp. 1-2.*
Harter, Charlie, "Why you should web-enable your AS/400", Sep. 1997, TUG (Toronto Users Group) e-server magazine, vol. 13, No. 1, pp. 1-3, www.tug.on.ca/articles/volume13/v13n1/v13n1_Harter_Web-enable-your-as400.html.*
Vermeer, Frederik J. G., Oil & Gas Journal. Tulsa: Apr. 13, 1992,vol. 90, Iss. 15; p. 47, 6 pgs, ProQuest document ID: 697503.*
Elgort, Bruce, "Developing a Palm VII PQA that reads data from a Domino database", 1999, Dominopower.com, pp. 1-7, www.dominopower.com/issuesprint/issue199912/pqa.html.*
Boyd, Thomas C, McConocha, Diane M, "Consumer household materials and logistics management: inventory ownership cycle", Summer 1996, vol. 30, Iss 1, p. 218, ProQuest ID 9675523.*
Schaeffer, Chris, "Performance Measurement", Mar. 1996, IIE Solutions, vol. 28, Iss 3, p. 20, ProQuest ID 9300478.*
Imberman, Woodruff, "Your Key to Quality: Employee Commitment", Jun. 1999, Advanced Battery Technology, vol. 35, Iss 6, p. 22, ProQuest ID 42373129.*

* cited by examiner

| Document NO. | Supplier Code | NC Part | Doc Type | Status | Date Added | Date Closed | Last Holder |
|---|---|---|---|---|---|---|---|
| 0006799901555C | 00067 | XXXXXXXX | CR | I | 02/04/2000 | | Smiths, Mike |
| 00067000053 | 00067 | XXXXXXXXX | CR | I | 04/27/2000 | | Johns, Mike |
| 00067000075 | 00067 | XXXXXXXXXXX | CR | I | 05/26/2000 | | Ward, Lisa |
| 00067000073 | 00067 | XXXXXXXXXXX | CR | I | 05/26/2000 | | Krieg, Ricky |
| 00067000072 | 00067 | XXXXXXXXXXX | CR | I | 05/26/2000 | | Myers, Paul |
| 00067000074 | 00067 | XXXXXXXXX | CR | I | 05/26/2000 | | Hines, Mark |
| 00067000076 | 00067 | XXXXXXXXX | CR | I | 05/30/2000 | | Arens, Henry |
| 00067000077 | 00067 | XXXXXXXXX | CR | I | 05/31/2000 | | Amon, Eric |
| 00067000079 | 00067 | XXXXXXXXX | CR | I | 06/01/2000 | | Stofan, Kory |
| 22865000051A | 22865 | XXXXXXXXX | CR | I | 05/25/2000 | | Adrian, Doug |
| 87593000035 | 87593 | XXXXXXXXX | CR | I | 05/23/2000 | | Stitzel, Tony |
| 87593000037 | 87593 | XXXXXXXXX | CR | I | 05/25/2000 | | Billisit, Rick |
| 87593000036 | 87593 | XXXXXXXXX | CR | I | 05/25/2000 | | Lutes, Jeff |

Disposition

Generate printable file

*170*

*174*

In Process

[Show full header]

Case Record Source Info:
Supplier Code: 22865
Supplier: XXXXXXXXXX
Originator Name: BOB
Phone: 243 2174
Fax: 243 2174

*176*

Document Number: XXXXXXXXXXX
Part Nonconforming: XXXXXXXXXX
Engine Program: CFXXX
Part Description: OUTER DUCT
Number Parts NC: 3
Number C/R Lines: 2

*178*

Go to line item: 1 2

Line Item

Line Item 1

*180*

| Location (sh zone): | XXXX |
| Quantity NC: | 10 |
| Char Class: | MN |

| Process Code: | AE |
| Cause Code: | 15 |
| Serial/Lot: | Non Serialized |

| Characteristics: | .21–.23 BOTH SIDES |
| Nonconformance Text: | nonconformance for line item 1 |

[History]

Dispsition: [None ▼]

Repair Remarks: ☑
Substantiation: ☑
TO: ☐

Edit disposition remarks.

Line Item 2

*180*

| Location (sh zone): | XXXX |
| Quantity NC: | 10 |
| Char Class: | MN |

| Process Code: | CA |
| Cause Code: | 12 |
| Serial/Lot: | Non Serialized |

| Characteristics: | .002–.005 U/MAX |
| Nonconformance Text: | nonconformance for line item 1 |

[History]

Dispsition: [None ▼]

Repair Remarks: ☑
Substantiation: ☐
TO: ☑

Edit disposition remarks.

METHODS AND SYSTEMS FOR AVIATION NONCONFORMANCE COMPONENT MANAGEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to supply chain services, and more specifically to methods and systems for managing turbine engine aircraft nonconforming components.

The manufacture of aircraft engine components, form, fit, and function of components are controlled by specifications included on component drawings. More specifically, engine components are manufactured in accordance with specified tolerances, and as such, engine component features may be inspected after manufacture is complete to determine compliance with the tolerances.

Because aircraft engine components may be manufactured with narrow tolerances, occasionally the nonconforming components must be dispositioned to determine compliance with the tolerances. More specifically, nonconforming components may be assessed to determine acceptance or rejection of the component, and if repairs would enable the components to satisfy the manufacturing tolerances. If repairs are warranted, a written report is generated to indicate corrective actions taken on the component. The written reports are maintained and may be entered into a monitoring system.

However, because multiple users manufacture and disposition nonconforming components, accessing nonconformance information about engine components may be a complex and time-consuming task. The problem is more complicated when parts are manufactured at one location, supplied at a different location, engineered at another location, and if necessary, repaired at a globally different location. Each location may utilize a different monitoring system that may not be compatible or accessible with systems used at other locations. Furthermore, each location may interpret inspection results differently, and may retain different nonconformance data. In addition, variations in the different facilities is a source of customer concern. As a result, analyzing historical nonconformance data for a component may be unreliable and time-consuming.

BRIEF SUMMARY OF THE INVENTION

In one aspect, the present invention is a computerized business process that captures component nonconformance data elements at an inspection process level. The nonconformance data is gathered via network-based data capture screens and image capture workstations. The data elements include information including the aircraft component nonconformance, component disposition, component repair or non-repairable status, and type of repair to be conducted. The information is uploaded to a database that is integrated with a nonconformance management system. The data is available for users, suppliers, and customers to view through a secure connection to a business entity's server system.

In another aspect, the present invention is a system for accessing aircraft engine component nonconformance information by supply chain parties including internal users, suppliers, and external customers. The system includes a server, at least one computer and a network connecting computers to the server. The server is configured with a user interface that allows a user to input information, including component nonconformance inspection reports, into the web pages for upload to the server. The user interface also allows a user to download information, including corrective action reports of repairable parts, from the database into the web pages.

DETAILED DESCRIPTION OF THE INVENTION

Exemplary embodiments of systems and processes that facilitate integrated network-based electronic reporting and workflow process management related to Nonconformance Management Services are described below in detail. The systems and processes facilitate, for example, electronic submission of nonconformance information using a client system, automated extraction of nonconformance information, and web-based assessment reporting and management of non-conformance component repair services information for system users.

The systems and processes are not limited to the specific embodiments described herein. In addition, components of each system and each process can be practiced independently and separately from other components and processes described herein. Each component and process can also be used in combination with other components and processes.

Figure 1:
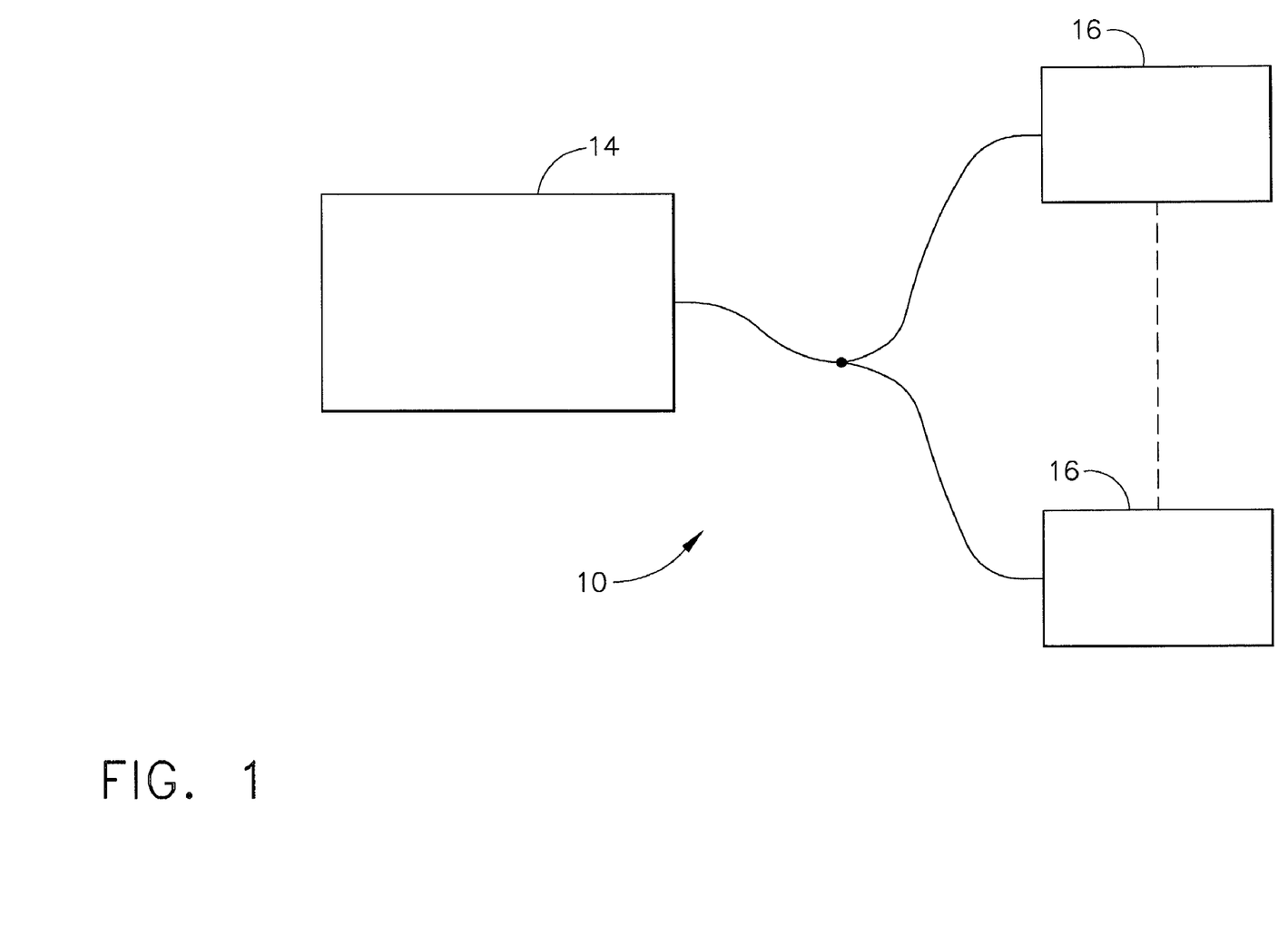
FIG. 1 is an exemplary embodiment of a block diagram of a nonconformance management system.

FIG. 1 is an exemplary block diagram of a nonconformance management system 10. In the exemplary embodiment, system 10 manages nonconformance data related to aircraft engine components. System 10 includes a server 14 and a plurality of devices 16 connected to server 14. In one embodiment, devices 16 are computers including a web browser, and server 14 is accessible to devices 16 via the Internet. In an alternative embodiment, devices 16 are servers for a network of customer devices. System 10 is coupled to a mass storage device (not shown).

Devices 16 are interconnected to the Internet through many interfaces including through a network, such as a local area network (LAN) or a wide area network (WAN), through dial-in-connections, cable modems and special high-speed ISDN lines. Alternatively, devices 16 could be any device capable of interconnecting to the Internet including a web-based phone or other web-based connectable equipment. A database providing enclosure information is stored on server 14 and can be accessed by potential customers at one of devices 16 by logging onto server 14 through one of devices 16.

System 10 is configured to provide various user interfaces whereby users, suppliers, and customers access nonconforming component information. More specifically, system 10 is configured to provide a plurality of users, suppliers, and customers performing various cross-functions, access to nonconforming component repair information. Server 14 is further configured with various databases and applications to allow the user entering nonconformance and repair information to store the information accessibly within server 14 for future retrieval. Server 14 accesses stored information and downloads the requested information to at least one of the client systems 16, when the request to download is received from client system 16. Server 14 utilizes a number of applications, described in more detail below, that reside on server 14, to store, update, retrieve, or download nonconformance and/or component repair information. In one embodiment, users, suppliers, and external customers access aircraft engine and component repair information. The plurality of databases and applications are accessed by users, suppliers, or customers using client system 16 configured with a standard web browser.

Figure 2:
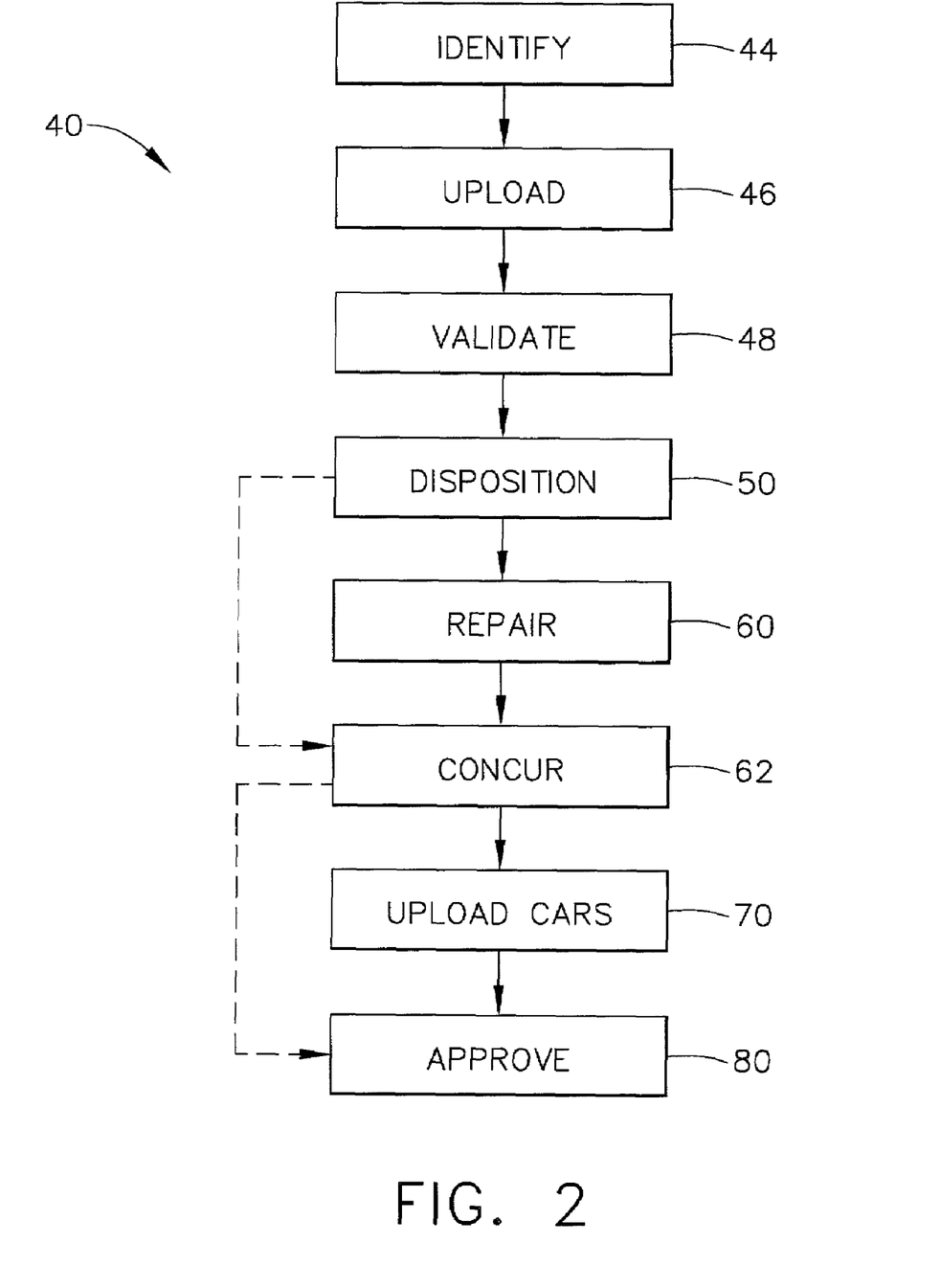
FIG. 2 is an exemplary embodiment of an information flow diagram illustrating process steps executed by the nonconformance management system shown in FIG. 1.

FIG. 2 is an exemplary embodiment of an information flow diagram 40 illustrating process steps executed by nonconformance management system 10 under the control of a processor (not shown). In one embodiment, system 10 is a linear process, and the process steps illustrated within information flow diagram 40 are performed sequentially. In an alternative embodiment, system 10 is a reiterative process, and the process steps illustrated within information flow diagram 40 may be performed randomly in any order.

When aircraft engine components (not shown) are manufactured, form, fit, and function of components and component features are controlled by predefined specifications and tolerances included within engineering drawings used in manufacturing the components. More specifically, as components are manufactured, various component features are evaluated in an inspection process to determine if the component features were manufactured within the specified tolerances. Components that are not within the specified tolerances are known as nonconformances. More specifically, such components are identified 44 for management within nonconformance management system 10. In one embodiment, a user performing a supplier function identifies 44 component nonconformances. In another embodiment, a user performing a shop function identifies 44 component nonconformances.

Server 14 is configured with databases and applications that allow users, suppliers, and customers to access and store nonconformance information. The nonconformances are evaluated to determine if the component is acceptable as is, or repairable to satisfy the specified tolerances. In one embodiment, such an analysis is known as a material review board (MRB). System 10 permits an MRB report to be generated after a plurality of cross-functional users collaborate regarding the nonconformances identified 44. For example, in one embodiment, server 14 includes a computerized business process that captures customer required data elements at the inspection process level. In another embodiment, when an MRB analysis indicates nonconformances, a hold ticket (not shown) is uploaded into system 10 to indicate a component that is a nonconformance.

Nonconformance data is uploaded 46 into system 10 via an intranet data capture screen and image capture workstation. In an alternative embodiment, users upload nonconformance information into system 10 through an electronic mail program. The data elements uploaded 44 include information regarding the aircraft component nonconformance, component repair or non-repairable status, type of repair to be conducted, primary nonconformance defect details, and digital images of the component feature that is non-conformant. Furthermore, because detailed descriptions of each nonconforming component are also uploaded, historical trending patterns of nonconforming components are generated with system 10. More specifically, the data is uploaded to a database integrated with nonconformance management system 10. The uploaded data is available for customer viewing through a secure connection to a business entity's Customer Web Center. The customer logs onto system 10 to review the captured data elements, images, histories, and trends.

System 10 also permits users to validate 48 nonconforming components. Validating 48 nonconformance data ensures that erroneous nonconformances are not inadvertently uploaded 46 into system 10. Adjustments to component manufacturing are dependent upon quality, completeness, and timeliness of nonconformance data uploaded 46 into system 10. Erroneous nonconformance information uploaded 46 into system 10 may skew historical trends, and cause component unnecessary or incorrect manufacturing adjustments based on such trends. In one embodiment, a user performing a quality control function validates 44 component nonconformance data uploaded 46 into system 10.

After nonconformance data is uploaded 46 into system 10, and the nonconformance component data is validated 44, the nonconforming component is scheduled for disposition 50. More specifically, for disposition 50, users evaluate nonconforming components within system 10 and determine whether a component is accepted, rejected as nonconforming, or whether repair procedures exist that should be performed for the component to conform to the manufacturing specified tolerances. Disposition data is accessible by system 10 and includes information regarding the aircraft component nonconformances, component work scope, component nonconformance disposition status, and detailed descriptions of repair procedures to be conducted. Because detailed descriptions of the nonconforming components include captured data elements, images, and historical trends that are accessible from system 10, system 10 facilitates users defining more accurate and reliable dispositions 50 of nonconforming components. In one embodiment, users performing an engineering function define dispositions 50 for nonconforming components within system 10. In one embodiment, users performing a laboratory function approve proposed dispositions 50.

Nonconforming components are then if necessary, repaired 60, if necessary. Users can access system 10 to review proposed dispositions 50 and enter comments regarding proposed dispositions 50. Specifically, system 10 permits users to concur 62 with proposed dispositions 50 prior to dispositions 50 being completed. More specifically, prior to dispositions 50 being completed, users, suppliers, and customers may concur 62 using an approval interface (not shown). The approval interface is a work scope field that includes detailed descriptions of the disposition, and if necessary, the repairs to be performed to the nonconforming component, and provides a means for a user to concur 62 with proposed dispositions 50. In the exemplary embodiment, a user level access permission level is required for quote approval or concurrence 62. In one embodiment, users performing a quality control function concur 62 with dispositions 50, and users performing either a shop function or a supply function execute dispositions 50. If repairs 60 are not deemed warranted, a user may still concur 62 with proposed dispositions 50.

After repairs 60 to a nonconforming component are completed, a corrective action report is uploaded 70 to system 10. The corrective action report includes a detailed description of the repairs completed, including component work scope, component repair or non-repairable status, and any captured data elements, and images. If a corrective action report is not deemed warranted because of a disposition 50 chosen, a user may approve 80 any process step of system 80 without uploading 70 a corrective action report to system 10.

Additionally, customers can access system 10 to approve 80 a final disposition of the component. Specifically, customers can access system 10 and approve 80 dispositions 50 once dispositions have been made. In addition, system 10 allows customers to review disposition data and associated reports, including information regarding the aircraft component nonconformance, component work scope, nonconformance disposition, component repair or non-repairable status, and detailed descriptions of repair procedures. Furthermore, customers are also given access to detailed descriptions of the nonconforming components including captured data elements, images, and historical trends accessible from system 10.

System 10 facilitates communication of inspection and repair information, as well as, approval of nonconformance proposed dispositions 50 through the network. More specifically, system 10 permits a plurality of cross-functional users to collaborate regarding the nonconforming components discovered during the material review board analysis. As a result, because nonconformance data is centrally stored within system 10, confusion and interpretation problems between various local sites are facilitated to be reduced or substantially eliminated. Accordingly, using system 10, nonconforming component identification 44 may be done locally, while dispositions 50 may be completed globally. As a result, system 10 facilitates shortening a length of time to disposition 50 a nonconforming component, thus expediting the process of returning a conforming component into service.

In addition, system 10 also permits metrics or benchmark goals to be developed. Metrics provide internal goals that represent accomplishments or future deadlines. In one embodiment, metrics are used to track the progress of nonconforming components through nonconformance management system 10. In another embodiment, users performing engineering functions use metrics to monitor dispositions 50. In another embodiment, customers use metrics for to monitor a status of components within nonconformance management system 10.

Furthermore, because system 10 accumulates data history of nonconforming components, nonconformance historical trends are generated. In one embodiment, the nonconformance trends are used to adjust component manufacturing processes, thus facilitating a reduction or a substantial elimination of the manufacturing of additional nonconforming components.

System 10 accumulates a variety of data for numerous in-process inspection results as well as business information that is highly confidential. Therefore, system 10 has different access levels to control and monitor the security of the system. Authorization for access is assigned by system administrators on a need to know basis. In an alternative embodiment, system 10 provides access based on job functions. In yet another embodiment of the invention, system 10 provides access based on positions and management authority within the business entity. The editing capabilities within system 10 are also restricted to ensure that only authorized individuals have access to modify or edit the information that is already existing in the system. These internal controls with reference to system security help system 10 to manage and control the access to the information.

The architectures of system 10 as well as various components of system 10 are exemplary only. Other architectures are possible and can be utilized in connection with practicing the processes described herein. In addition, nonconformance management system 10

Figure 3:
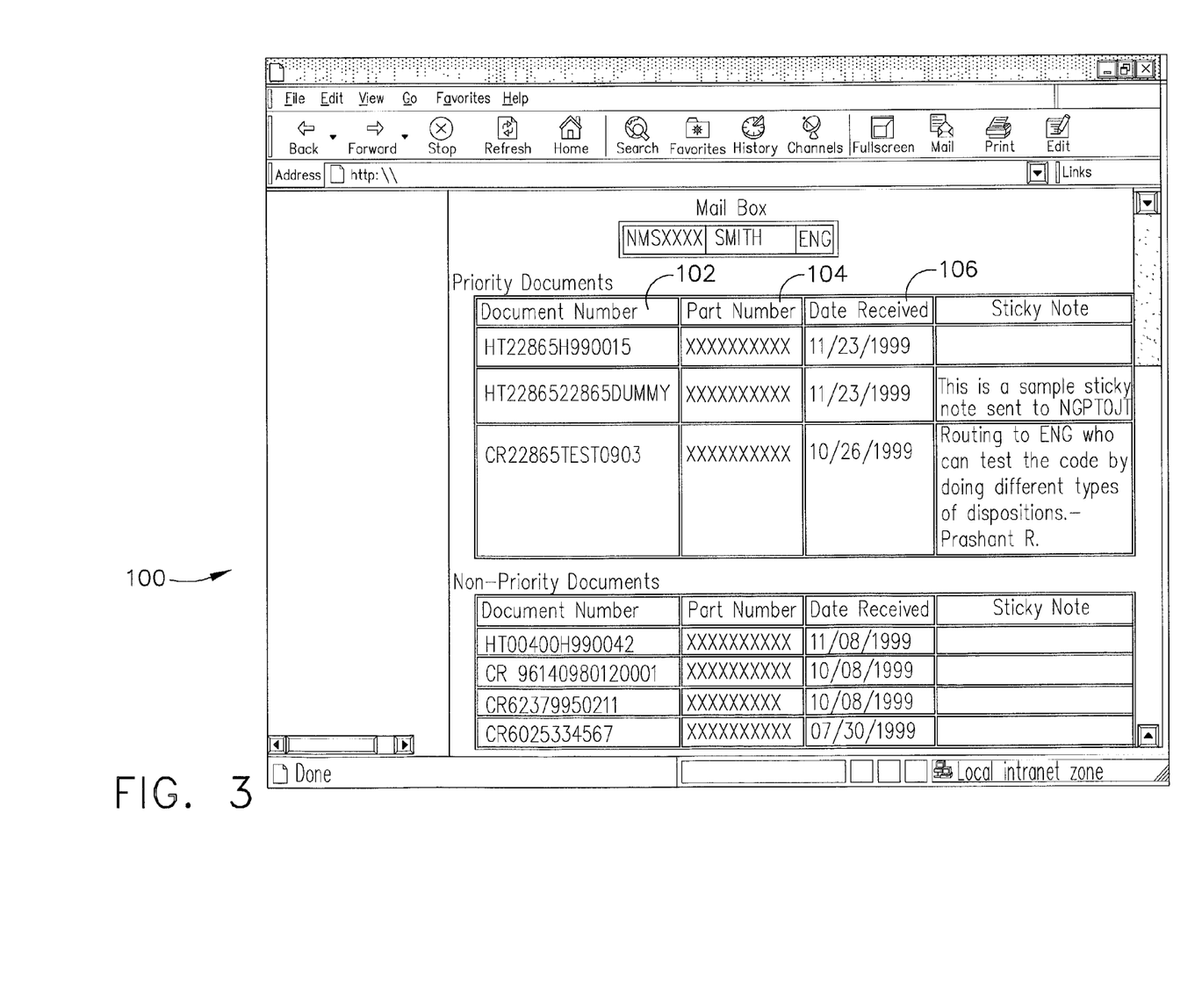
FIG. 3 is an exemplary embodiment of a web page used with the system shown in FIG. 1 for uploading nonconformance information.

FIG. 3 is an exemplary embodiment of a web page 100 used with system 10 shown in FIG. 1 for accessing in-process documents. More specifically, web page 100 is an intranet data capture screen and image capture workstation that is integrated with an electronic mail program. In the exemplary embodiment, because web page 100 is integrated with an electronic mail program, as nonconformance component information is entered into system 10, automatic e-mails are generated and sent electronically to users performing various functions. As described above, web page 100 is used to upload nonconformance component information into system 10 identified 44 (shown in FIG. 2) during an MRB analysis. More specifically, system 10 assigns nonconformance component information a document number 102 and sorts nonconformance data based on a part or serial number 104 of the nonconforming component. Additionally, a date 106 received is recorded within system 10 for use with metrics and trending. In addition, a sticky note or an attachment area 108 permits a user to enter comments regarding the nonconformance component information entered into system 10. Comments entered in sticky note area 108 remain electrically coupled to the associated nonconformance information and are also accessible by users, suppliers, and customers. In the exemplary embodiment, system 10 also permits a user to establish priorities of the nonconformance information entered into system 10.

The nonconformance component data entered into system 10 via web page 100 includes information regarding the aircraft component nonconformance, component disposition, and if necessary, the repair or non-repairable status, type of repair to be conducted, primary non-repairable defect, and digital images of the nonconforming component feature.

Figure 4:
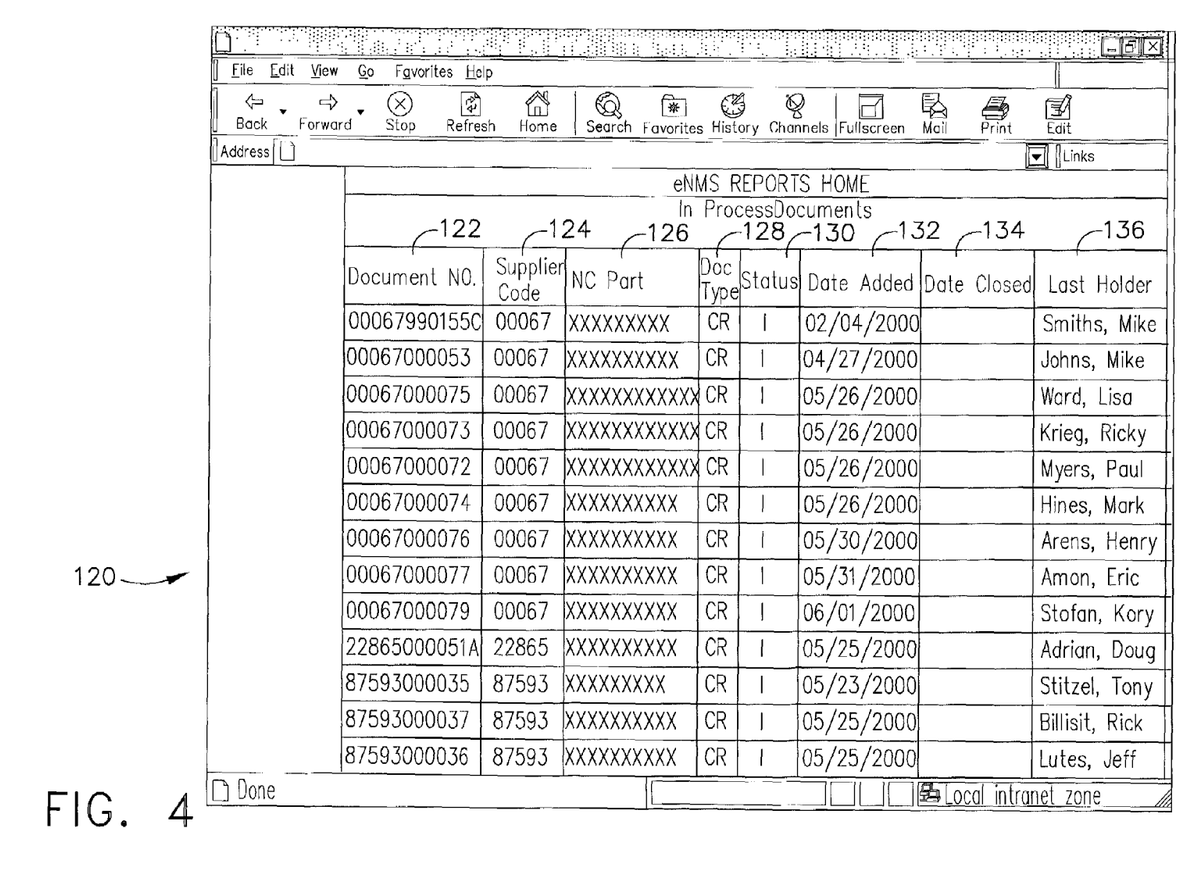
FIG. 4 is an exemplary embodiment of a web page used with the system shown in FIG. 1 for providing details regarding specific nonconformance information.

FIG. 4 is an exemplary embodiment of a web page 120 used with system 10 (shown in FIG. 1) for providing details regarding specific nonconformance component information. Web page 120 displays document numbers 122, supplier codes 124, part numbers 126, a document type 128, and a status 130. Also included are a date 132 data was added to system 10, a date 134 data was closed within system 10, and a last holder 136. More specifically, user may utilize various filter criteria, 122, 124, 126, 128, 130, 132, 134, and 136 to retrieve relevant data from system 10. In the exemplary embodiment, selecting and clicking on a document number 122 hypertext link, system 10 downloads and displays the subsequent user interface (not shown) associated with that document number 122.

Figure 5:
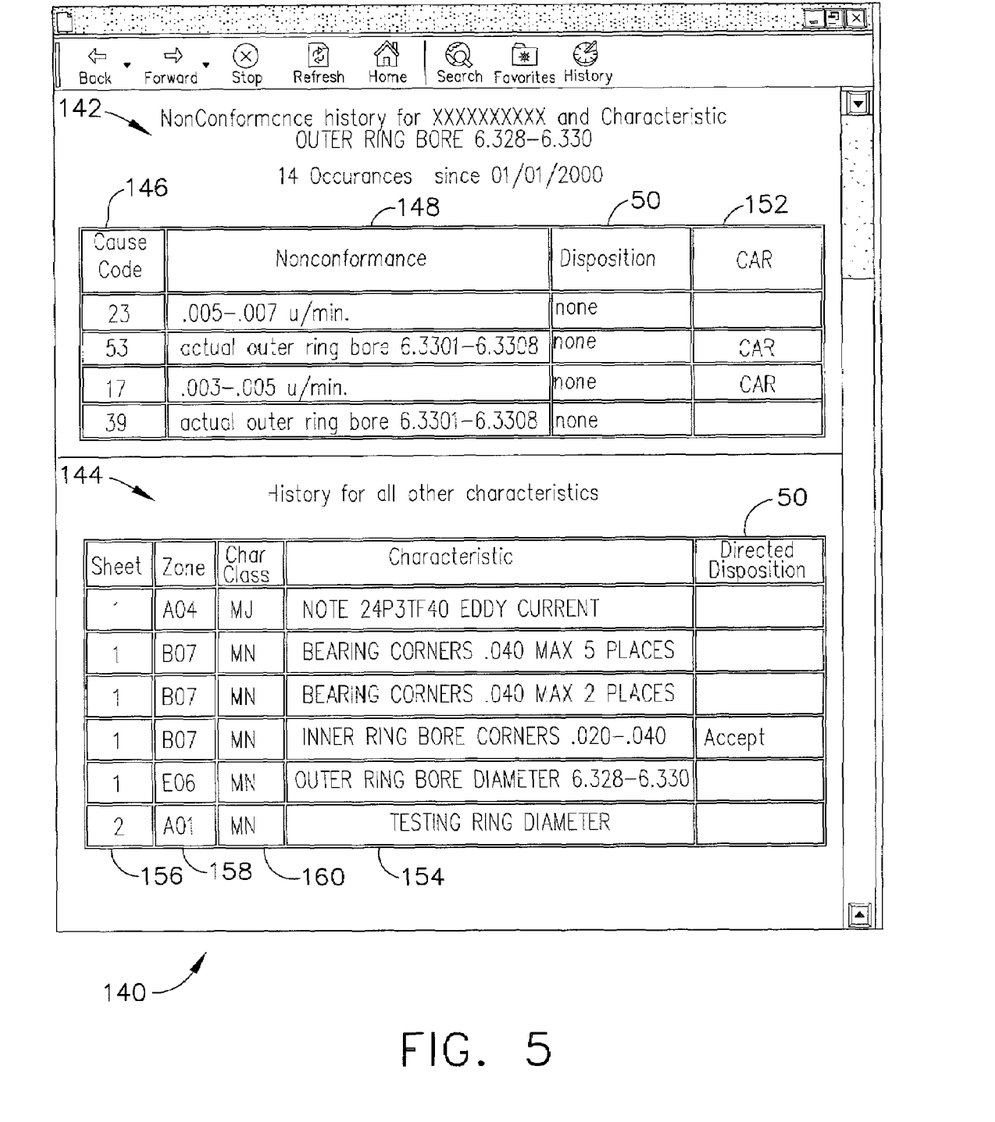
FIG. 5 is an exemplary embodiment of a web page used with the system shown in FIG. 1 for uploading dispositions.

FIG. 5 is an exemplary embodiment of a web page 140 used with system 10 (shown in FIG. 1) for uploading dispositions 50. More specifically, web page 140 is displayed when a user preparing to enter dispositions 50, searches system 10 using filter criteria to retrieve relevant historical data 142 for a specific component and a specific nonconformance characteristic. In addition, web page 140 provides relevant historical data 144 for any remaining nonconformance characteristics of the same specific component. Included and displayed within historical data 142 are a cause code 146, a description 148 of the nonconformance, and a column indicating dispositions 50, and whether dispositions 50 have been accepted. Additionally, a column 152 is provided with hypertext links to corrective action reports (CARs).

In addition, historical data 144 provides a hypertext link 154 to detailed information regarding data for other nonconformance characteristics. Additionally, sheet data 156, a zone 158 of the component, and a characteristic classification 160 is displayed.

Figure 6A:
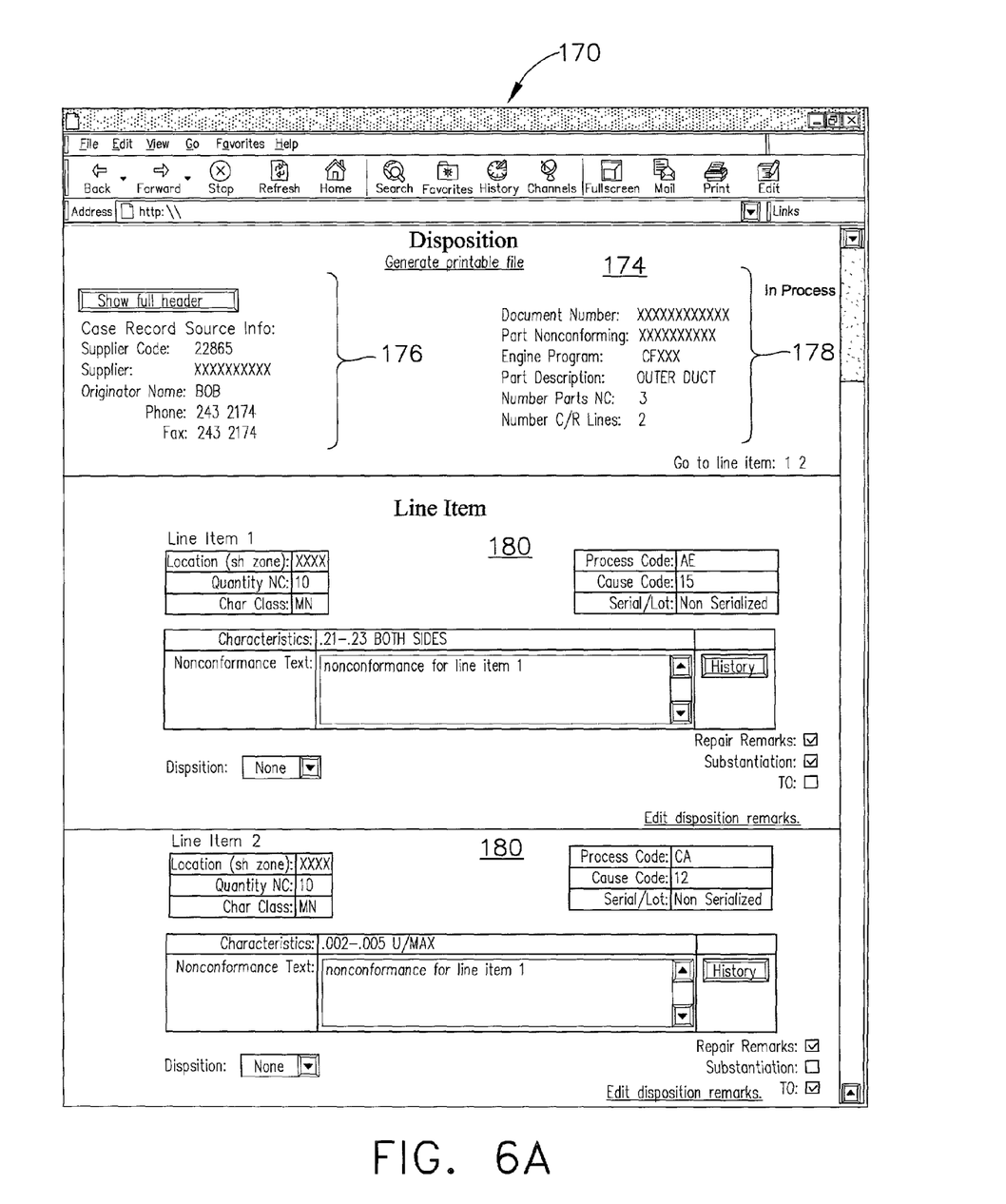
FIG. 6 is an exemplary embodiment of a web page used with the system shown in FIG. 1 for uploading dispositions.
Figure 6B:
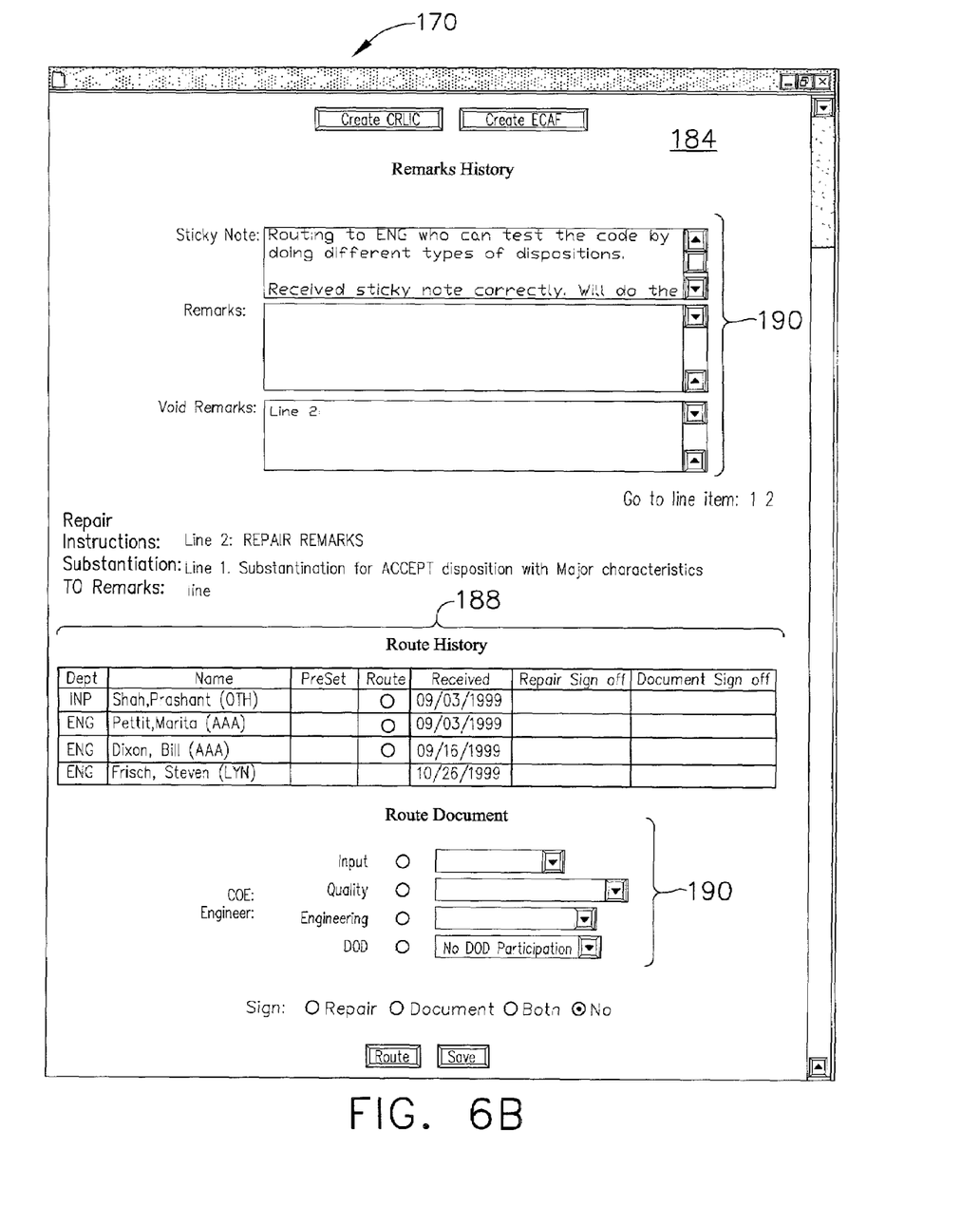

FIG. 6 is an exemplary embodiment of a web page 170 used with system 10 (shown in FIG. 1) for uploading dispositions 50. More specifically, web page 170 includes a summary section 174 that illustrates a portion of data entered in system 10 regarding the component, including case record source information 176, and component classification information 178. Additionally web page 170 includes a plurality of line item sections 180 which enable a user to enter remarks and data regarding depositions 50 for the nonconforming component. More specifically, a line item section 180 is included for each nonconformance characteristic entered for a specific component.

Web page 170 also provides a history portion 184 that illustrates a routing history 186 and a remarks history 188 of the nonconformance data. Furthermore, history portion 184 allows a user to enter routing information 190 to route the nonconformance data to another user. By guiding user inputs using various web page interfaces, system 10 ensures users upload standardized inspection data to the database and thereby facilitates reducing variations between various user inspection and repair facilities.

Figure 7:
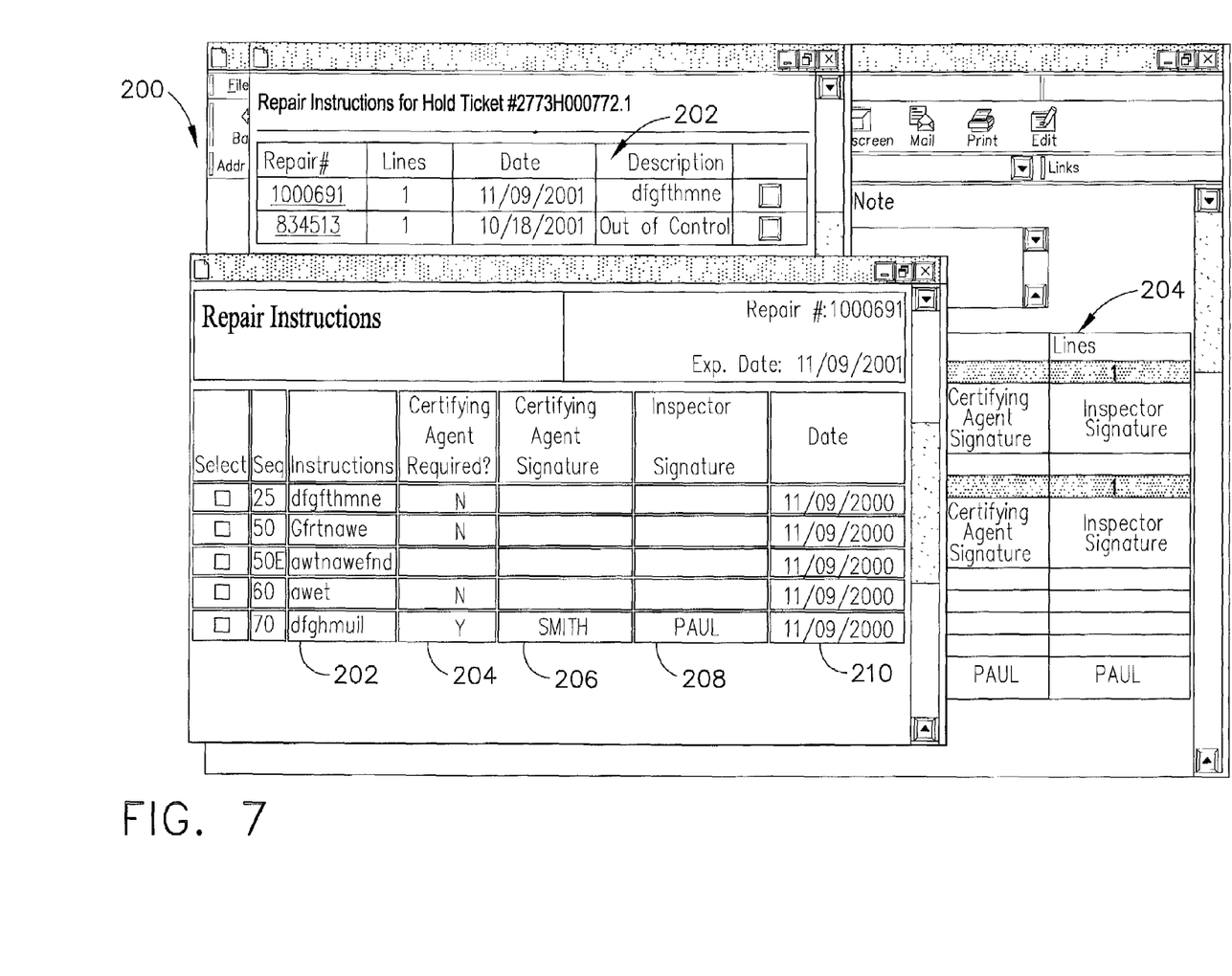
FIG. 7 is an exemplary embodiment of a web page used with the system shown in FIG. 1 for approving dispositions.

FIG. 7 is an exemplary embodiment of several web pages 200 used with system 10 (shown in FIG. 1) for approving 62 (shown in FIG. 2) dispositions 50 (shown in FIGS. 2 and 6). More specifically, web pages 200 provide detailed instructions 202 for depositions 50, a column 204 indicating whether a certifying agent is required, and columns 206 and 208 for electronic signatures of certifying agents and inspectors, respectively. Additionally, a date column 210 is included and used in trending and metrics. Through web page 200, a user may download and display dispositions 50, historical data 142 (shown in FIG. 5) and 144 (shown in FIG. 5), nonconformance information previously entered through other web pages including web page 120 and web page 100, and any other nonconformance information entered for the specific component.

Figure 8:
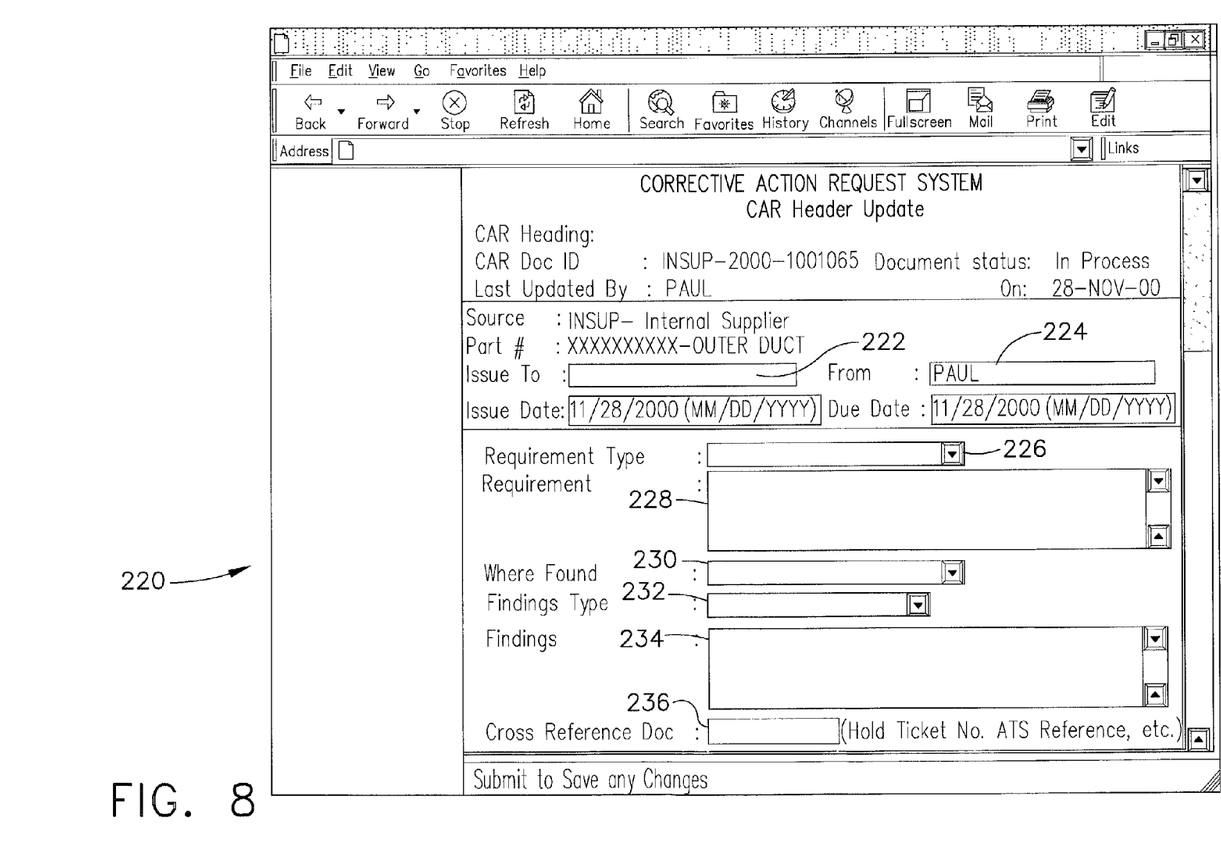
FIG. 8 is an exemplary embodiment of a web page used with the system shown in FIG. 1 for entering corrective actions.

FIG. 8 is an exemplary embodiment of a web page 220 used with system 10 (shown in FIG. 1) for entering corrective actions. More specifically web page 220 includes text boxes 222 and 224, respectively, for forwarding corrective action requests to a user and for indicating the sender of the corrective action requests. Additionally, the user may enter a requirement type 226, a requirement 228, a location where found 230, and a findings type 232 using pull down menus.

Furthermore, web page 220 includes text boxes 234 and 236, respectively, used by a user to enter detailed descriptions of the findings and a cross reference document.

Figure 9:
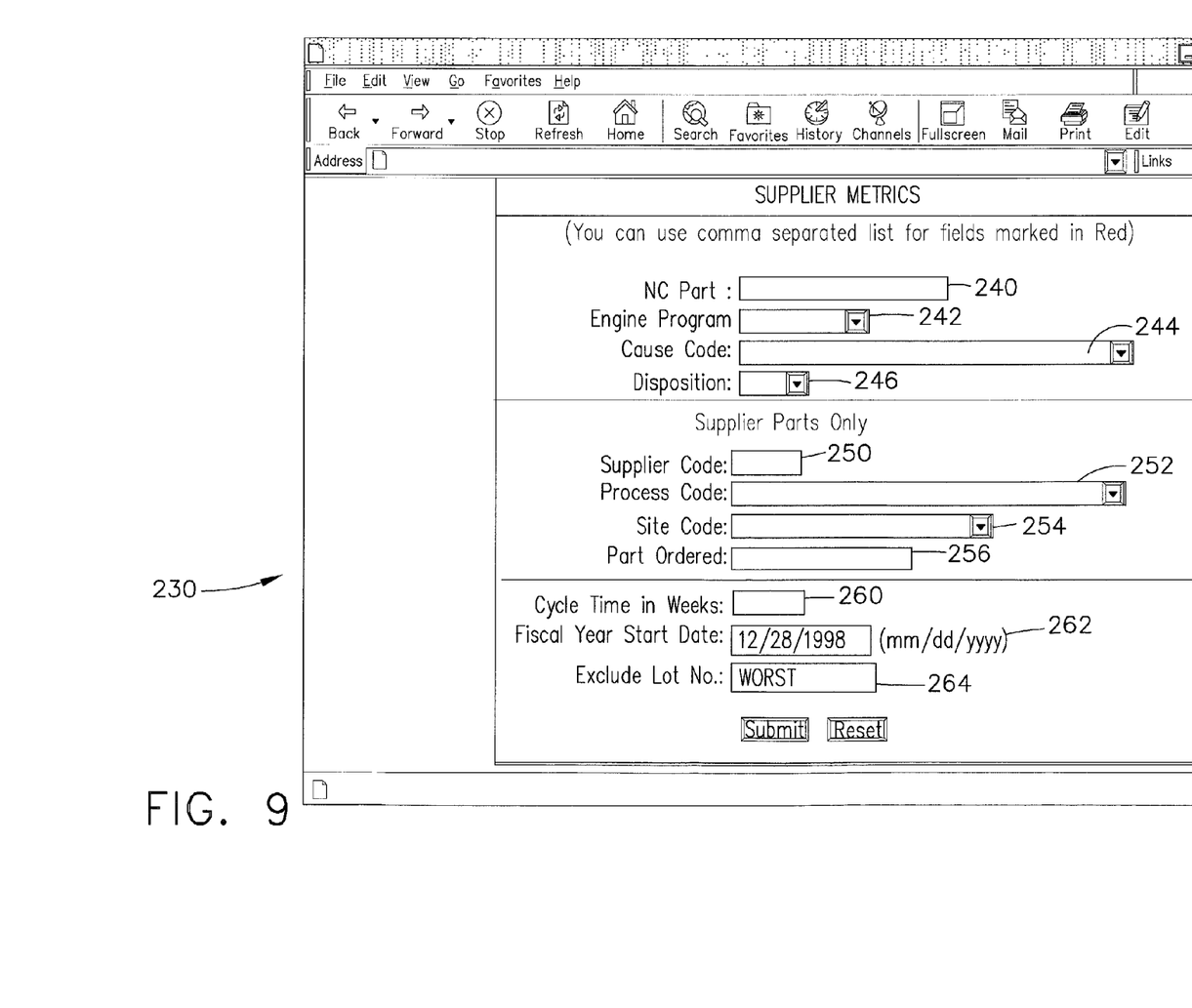
FIG. 9 is an exemplary embodiment of a web page used with the system shown in FIG. 1 for entering metrics.

FIG. 9 is an exemplary embodiment of a web page 230 used with system 10 shown in FIG. 1 for entering metrics. Metrics provide internal goals representing accomplishments. In one embodiment, metrics are used to track the progress of nonconforming components through management system 10. Web page 230 provides an interface whereby a user can enter criteria for metrics. Included are text boxes for indicating a nonconforming component 240, an engine program 242, a cause code 244, and a disposition 246. Additionally, users performing a supply function may also enter data in text boxes indicating a supplier code 250, a process code 252, a site code 254, and a part ordered 256. Web page 230 also includes text boxes for users to enter a cycle time 260 for the metrics, a fiscal year start date 262, and an exclude lot number 264.

Figure 10:
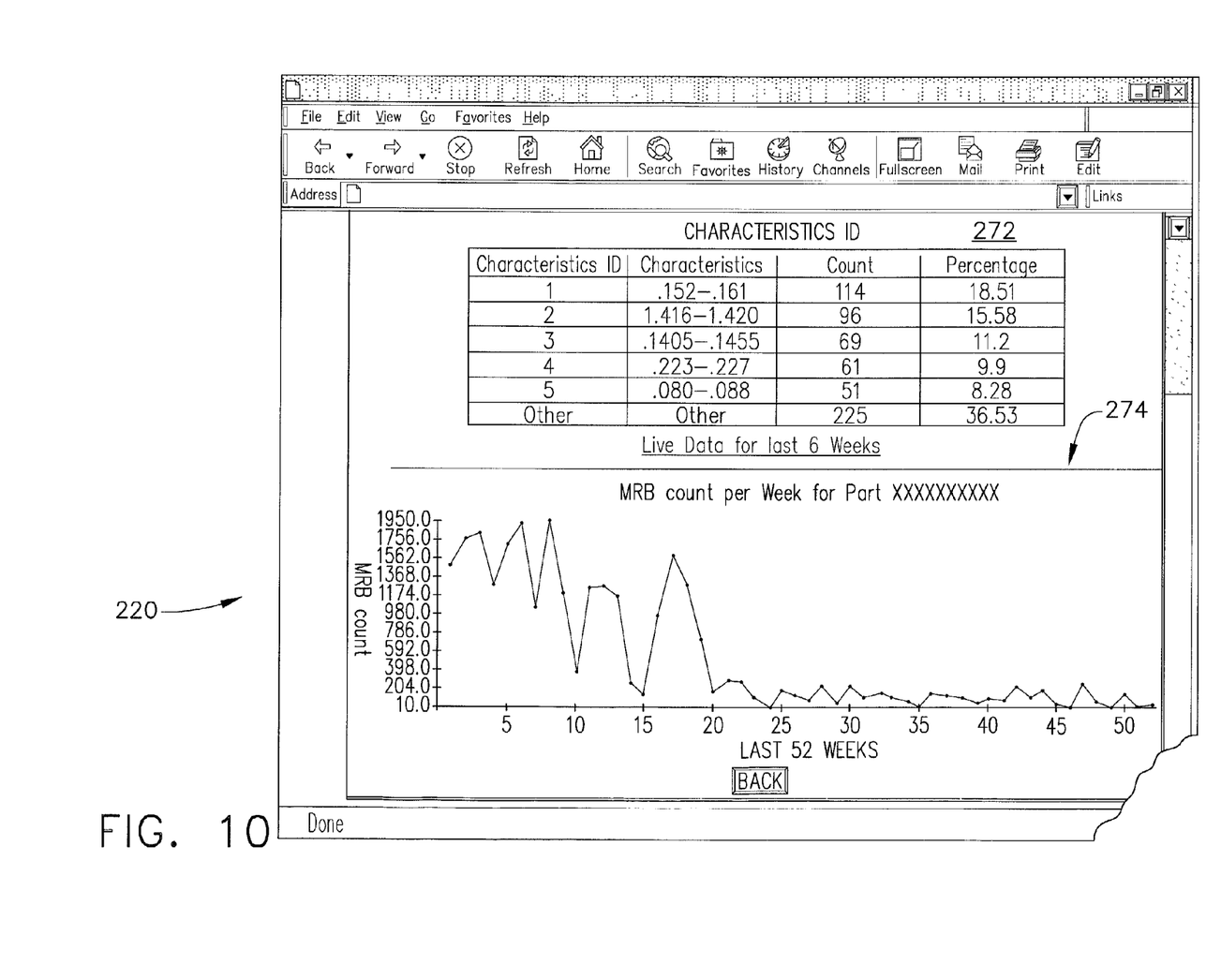
FIG. 10 is an exemplary embodiment of a web page used with the system shown in FIG. 1 for illustrating nonconformance trends.

FIG. 10 is an exemplary embodiment of a web page 270 used with system 10 shown in FIG. 1 for illustrating nonconformance trends. More specifically, web page 270 permits a user to enter search criteria to view characteristics 272 of a specific component, such that historical trending charts 274 may be developed.

While the invention has been described in terms of various specific embodiments, those skilled in the art will recognize that the invention can be practiced with modification within the spirit and scope of the claims.

What is claimed is:

1. A system configured for accessing aircraft engine component disposition information by internal users, suppliers, and external customers, said system comprising:
 a server comprising:
  a database of disposition order and quality information, relating to a component during a manufacturing process;
  a plurality of web pages comprising data fields associated with the component and disposition information;
  a user interface allowing a user and at least one of a customer and a supplier to input information, including inspection reports, into the web pages for upload to said server, and allowing a user and at least one of the customer and the supplier to download into the web pages information from said database including corrective action reports of repairable parts;
  wherein said server is configured to allow the user and the at least one of a customer and a supplier to store and download information to the user interface including information indicative of a component's non-conformance with respect to predefined manufacturing tolerances, digital images of the non-conforming component feature, and information indicative of the component's repair status including a type of repair to be conducted and primary non-repairable defects;
  wherein the user and the at least one of a customer and a supplier evaluate said information to determine whether to accept a non-conformance, reject a non-conformance, or repair a non-conformance, wherein accepted non-conformances are used for an alternate function;
  wherein said server is further configured to develop benchmark goals, representing an accomplishment, a deadline, a progress of the component through the system, and a state of the component through the system;

at least one computer; and a network coupling said at least one computer to said server.

2. A system in accordance with claim 1 wherein said server further configured to generate trending data from stored non-conformance data, the trending data accessible by a plurality of users.

3. A system in accordance with claim 1 wherein said server further configured to provide a facility for users, suppliers, and customers to provide feedback on non-conforming components and disposition information.

4. A system in accordance with claim 1 wherein said server further configured to store standardized inspection data thereby reducing variations in component inspections and dispositions between various user inspection and disposition facilities.

5. A system according to claim 1 wherein said server further configured to provide functionality for the incorporation of customer approval for component dispositions.

6. A system in accordance with claim 1 wherein said server further configured to store and download to the user interface digital images of non-conforming components, including a cause of non-conformance, by part serial number.

7. A system in accordance with claim 1 wherein according to claim 1 wherein said server further configured to provide a facility for users, suppliers, and customers to receive a status report by component serial number of non-conforming component dispositions.

8. A method for accessing aircraft engine component disposition information by internal users, suppliers and external customers using a component management system including a server and at least one client system, said method comprising the steps of:

uploading user information to the server;

downloading from the server, web pages configured to direct customer access to databases within the server, the databases configured with component and disposition information;

wherein said downloading from the server component and disposition information comprises downloading user links to data including information representative of a component's non-conformance with respect to predefined manufacturing tolerances, digital images of the non-conforming component feature, and information indicative of the component's repair status including a type of repair to be conducted and primary non-repairable defects;

uploading user selections and at least one of a customer selection and a supplier selection input into the web pages to the server, wherein the selections input into the web pages include selections of user links;

downloading from the server corrective action reports and component disposition information from the databases as selected by the user of the system; evaluating the data, by a user and at least one of a customer and a supplier, to determine whether to accept a non-conformance, reject a non-conformance, or repair a non-conformance, wherein accepted non-conformances are used for an alternate function; and using information in the system relating to a component during a manufacturing process to develop benchmark goals, representing an accomplishment, a deadline, a progress of the component through the system, and a state of the component through the system.

9. A method in accordance with claim 8 wherein said step of downloading from the server corrective action reports further comprises the step of downloading to the user interface digital images of non-conforming components, including a cause of non-conformance, by component serial number.

10. A method in accordance with claim 8 wherein said step of uploading user selections input into the web pages further comprises the step of uploading user and customer feedback on the system.

11. A method in accordance with claim 8 wherein said step of uploading user selections input into the web pages further comprises the step of standardizing inspection data thereby reducing variations in component inspections and dispositions between various user inspection and disposition facilities.

12. A method in accordance with claim 8 wherein said step of downloading from the server corrective action reports and component disposition information further comprises the step of downloading an approval form.

13. A method in accordance with claim 8 wherein said step of uploading user selections input into the web pages further comprises the step of uploading customer approval for component dispositions.

14. A method in accordance with claim 8 wherein said step of downloading from the server web pages further comprises the step of downloading component non-conformance trend data.

15. A method in accordance with claim 8 wherein said step of downloading from the server web pages further comprises the step of downloading component status reports indicating an amount of progress of component dispositions by component serial number.

* * * * *